(12) United States Patent  
Szeremeta et al.

(10) Patent No.: US 7,013,731 B1
(45) Date of Patent: Mar. 21, 2006

(54) DATA STORAGE TESTING APPARATUS FOR DELIVERING LINEAR OR ROTATIONAL ACCELERATION

(75) Inventors: Wally Szeremeta, Mission Viejo, CA (US); Arafat M. Butt, Lake Forest, CA (US); Raffi Codilian, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/966,550

(22) Filed: Oct. 15, 2004

(51) Int. Cl.
*G01N 29/00* (2006.01)
*B06B 3/00* (2006.01)
*H04R 9/04* (2006.01)

(52) U.S. Cl. ............................. 73/593; 73/668; 73/663
(58) Field of Classification Search ................... 73/593
See application file for complete search history.

(56) References Cited

U.S. PATENT DOCUMENTS 6,330,828 B1 * 12/2001 Nagl et al. .................... 73/668
6,543,289 B1 * 4/2003 Jinzenji et al. ............... 73/668

\* cited by examiner

*Primary Examiner*—Hezron Williams
*Assistant Examiner*—Tamiko Bellamy
(74) *Attorney, Agent, or Firm*—Stetina Brunda Garred & Brucker

(57) ABSTRACT

A testing apparatus for use with a data storage component that includes a base platform and a retaining element coupled to the base platform. The retaining element is sized and configured to retain the data storage component. The retaining element is linearly movable relative to the base platform during a linear acceleration mode without substantial rotational movement. The retaining element is rotationally movable relative to the base platform without substantial linear movement during a rotational acceleration mode. The testing apparatus further includes an actuator disposable in mechanical communication with the retaining element for moving the retaining element relative to the base platform.

19 Claims, 5 Drawing Sheets

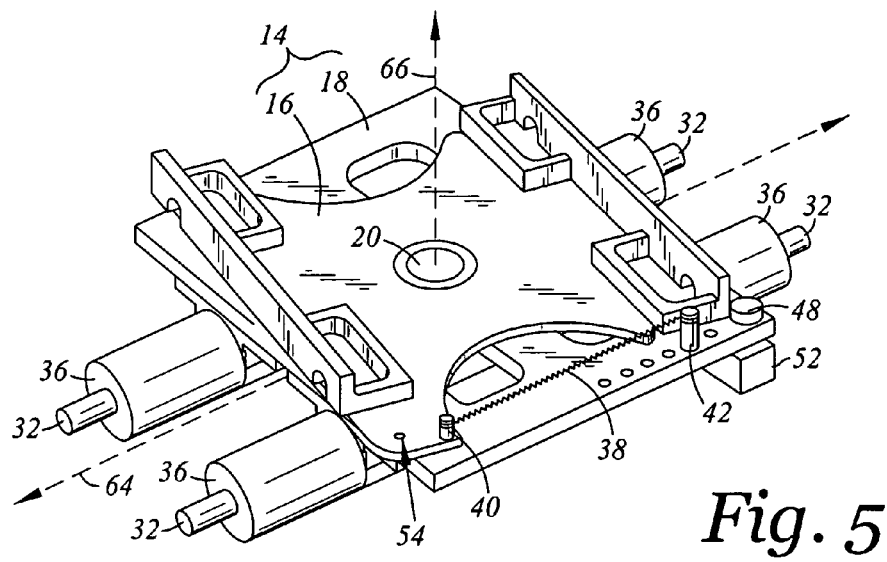
Fig. 5
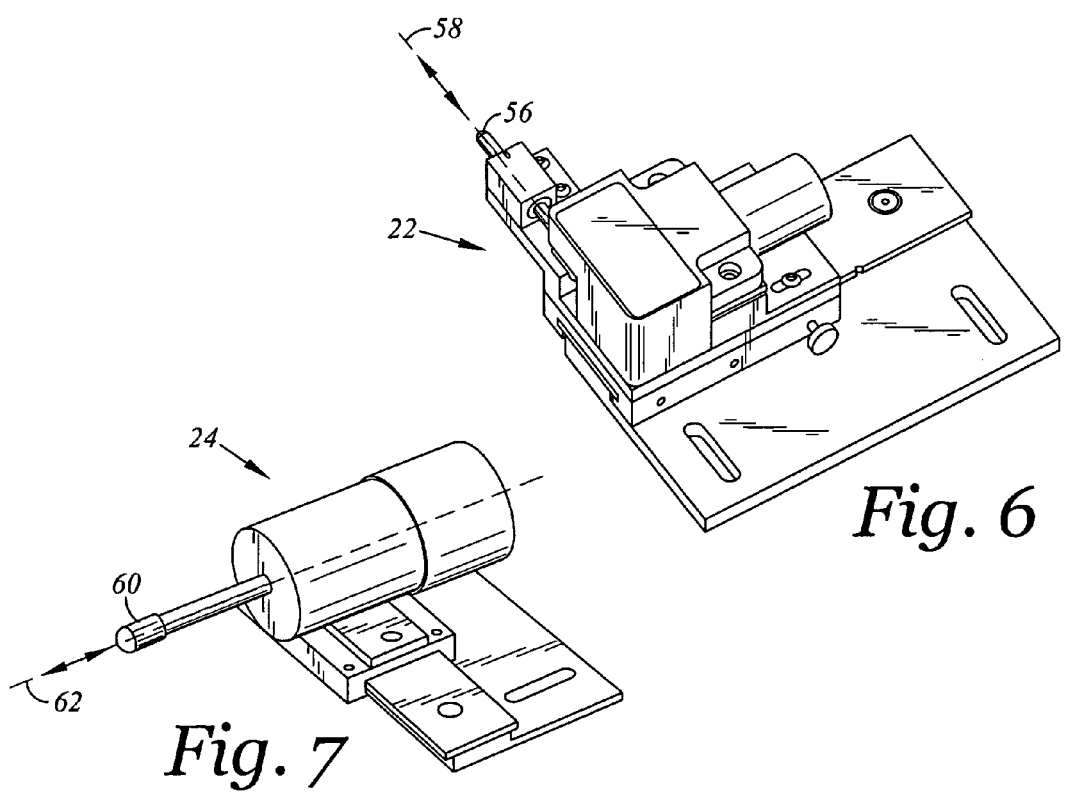
Fig. 6
Fig. 7

DATA STORAGE TESTING APPARATUS FOR DELIVERING LINEAR OR ROTATIONAL ACCELERATION

BACKGROUND OF THE INVENTION

1. Field of the Invention

The present invention relates generally to a testing device of a data storage component such as a disk drive, and in particular to a data storage testing apparatus for delivering linear or rotational acceleration.

2. Description of the Prior Art

There are many different types of data storage devices including their various data storage components. A common data storage device is a hard disk drive. The typical hard disk drive includes a variety of disk drive components, such as a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base. The head stack assembly has a pivoting actuator assembly having at least one transducer head, typically several, for reading and writing data from and to the disk.

Mechanical testing of such data storage devices is required during various phases of production as well as after completion. Such mechanical testing includes linear and rotational testing in both vibrational and shock modes. Testing may be used to evaluate performance of the data storage device both during and after being subjected to such mechanical tests. Typically, mechanical testing is performed in-house with application of very expensive and large electromagnetic vibration shakers. These shakers take the form of various testing stations separately dedicated for linear vibration, rotational vibration, linear shock, and rotational shock modes. Such stations may be large scale and configured to test many devices at once. Especially during product development, the use of the various testing stations can become a bottleneck for engineers who need to test a given product design. As such, there is a need in the art for an improved testing apparatus in comparison to the prior art.

SUMMARY OF THE INVENTION

According to an aspect of the present invention, there is a testing apparatus for use with a data storage component. The testing apparatus includes a base platform. The testing apparatus further includes a retaining element coupled to the base platform. The retaining element is sized and configured to retain the data storage component. The retaining element is linearly movable relative to the base platform during a linear acceleration mode without substantial rotational movement. The retaining element is rotationally movable relative to the base platform without substantial linear movement during a rotational acceleration mode. The testing apparatus further includes an actuator disposable in mechanical communication with the retaining element for moving the retaining element relative to the base platform.

According to various embodiments, the actuator may be a vibration actuator, such as a dc motor. Further, the actuator may be a shock actuator such as a solenoid device. In addition, the actuator may include both a vibration actuator and a shock actuator. The data storage component may be a disk drive base and the retaining element may be sized and configured to retain the disk drive base. The retaining element may include a first fixture sized and configured to retain the data storage component. The retaining element may further include a second fixture coupled to the first fixture and the base platform. The second fixture may include a first configuration with the second fixture being fixed relative to the first fixture. The second fixture may include a second configuration with the second fixture being rotatably coupled to the first fixture. The first and second fixtures are linearly movable relative to the base platform during the linear acceleration mode without substantial rotational movement with the second fixture in the second configuration. The first fixture is rotationally movable relative to the second fixture and the base platform without substantial linear movement during a rotational acceleration mode with the second fixture in the second configuration. The actuator is disposable in mechanical communication with the first fixture with the second fixture in the first configuration for linearly moving the first fixture relative to the base platform. The actuator is further disposable in mechanical communication with the first fixture with the second fixture in the second configuration for rotatably moving the first fixture relative to the second fixture and the base platform. A pivot pin may be disposed between the first and second fixtures for relative rotational movement. A locking pin may be provided for fixedly coupling the second fixture relative to the first fixture in the first configuration of the second fixture.

According to another aspect of the present invention, there is provided a testing apparatus for use with a data storage component. The testing apparatus includes a base platform, a first fixture sized and configured to retain the data storage component, and a second fixture coupled to the first fixture and the base platform. The second fixture includes a first configuration with the second fixture being fixed relative to the first fixture and linearly movable relative to the base platform without substantial rotational movement. The second fixture includes a second configuration with the second fixture being rotatably coupled to the first fixture. In the second configuration, the first fixture is rotationally movable relative to both the second fixture and the base platform without substantial linear movement with the second fixture in the second configuration.

According to various embodiments, the testing apparatus may further include a pivot pin disposed between the first and second fixtures for relative rotational movement. A locking pin may be provided for fixedly coupling the second fixture relative to the first fixture in the first configuration of the second fixture. The data storage component may be a disk drive base and the first fixture is sized and configured to retain the disk drive base.

BRIEF DESCRIPTION OF THE DRAWINGS

FIG. 5 is the perspective view of the retaining element and the base support element of FIG. 2 as shown with a first fixture of the retaining element rotated relative to a second fixture of the retaining element;

FIG. 6 is an enlarged perspective view of a vibration actuator of FIG. 1 as shown from another angle;

FIG. 7 is an enlarged perspective view of a shock actuator of FIG. 1;

DESCRIPTION OF THE PREFERRED EMBODIMENTS

Figure 1:
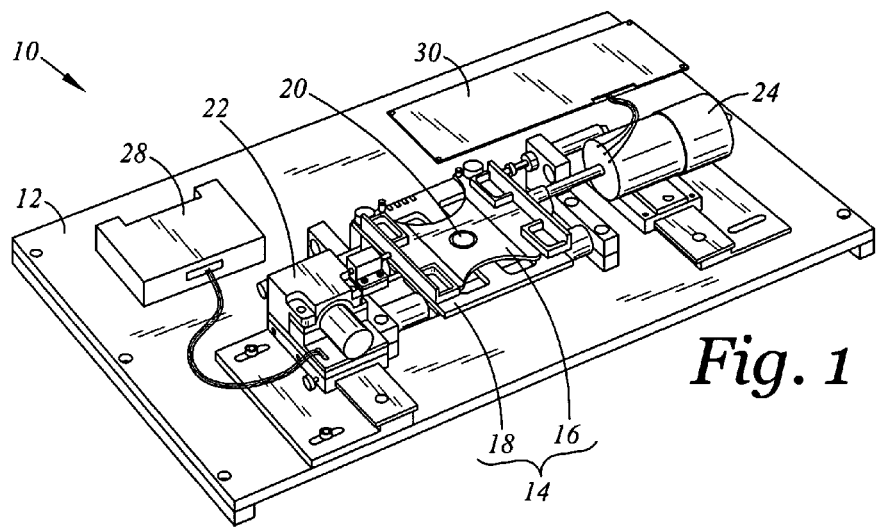
FIG. 1 is a perspective view of a data storage testing apparatus of an aspect of the present invention.

Referring now to the drawings wherein the showings are for purposes of illustrating preferred embodiments of the present invention only, and not for purposes of limiting the same, FIGS. 1–13 illustrate a data storage testing apparatus in accordance with aspects of the present invention.

Figure 4:
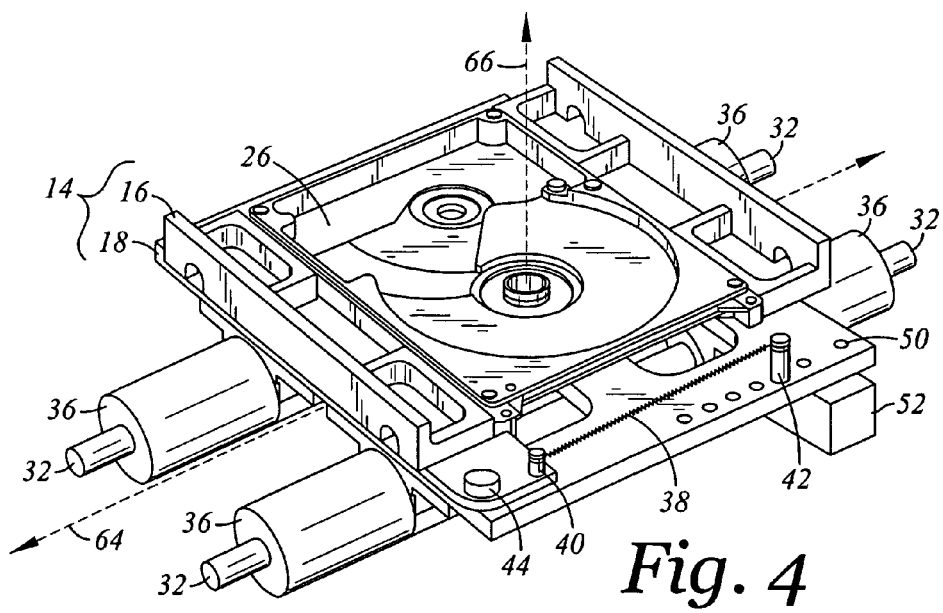
FIG. 4 is the perspective view of the retaining element and the base support element of FIG. 2 as shown with a data storage component.

Referring now to FIG. 1, there is depicted a perspective view of a testing apparatus 10. As will be discussed in detail below, the testing apparatus 10 is for use with a data storage component 26 (such as shown in FIG. 4) and is capable of delivering a linear acceleration or a rotational acceleration. According to an aspect of the present invention, there is the testing apparatus 10 for use with the data storage component 26. The testing apparatus 10 includes a base platform 12. The testing apparatus 10 further includes a retaining element 14 coupled to the base platform 12. The retaining element 14 is sized and configured to retain the data storage component 26. The retaining element 14 is linearly movable relative to the base platform 12 during a linear acceleration mode without substantial rotational movement. The retaining element 14 is rotationally movable relative to the base platform 12 without substantial linear movement during a rotational acceleration mode. The testing apparatus 10 further includes an actuator, such as a vibration actuator 22 or a shock actuator 24, disposable in mechanical communication with the retaining element 14 for moving the retaining element 14 relative to the base platform 12. As such, combined in the testing apparatus 10 is the capability to deliver either linear acceleration or rotational acceleration to the data storage component 26.

Figure 2:
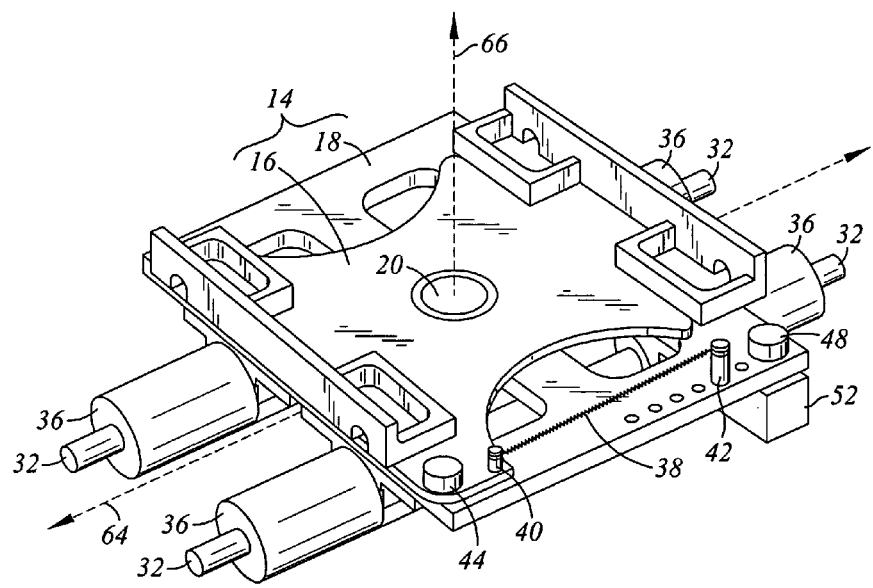
FIG. 2 is an enlarged perspective view of a retaining element of the testing apparatus of FIG. 1 as seen from another angle, as shown with a base support.
Figure 3:
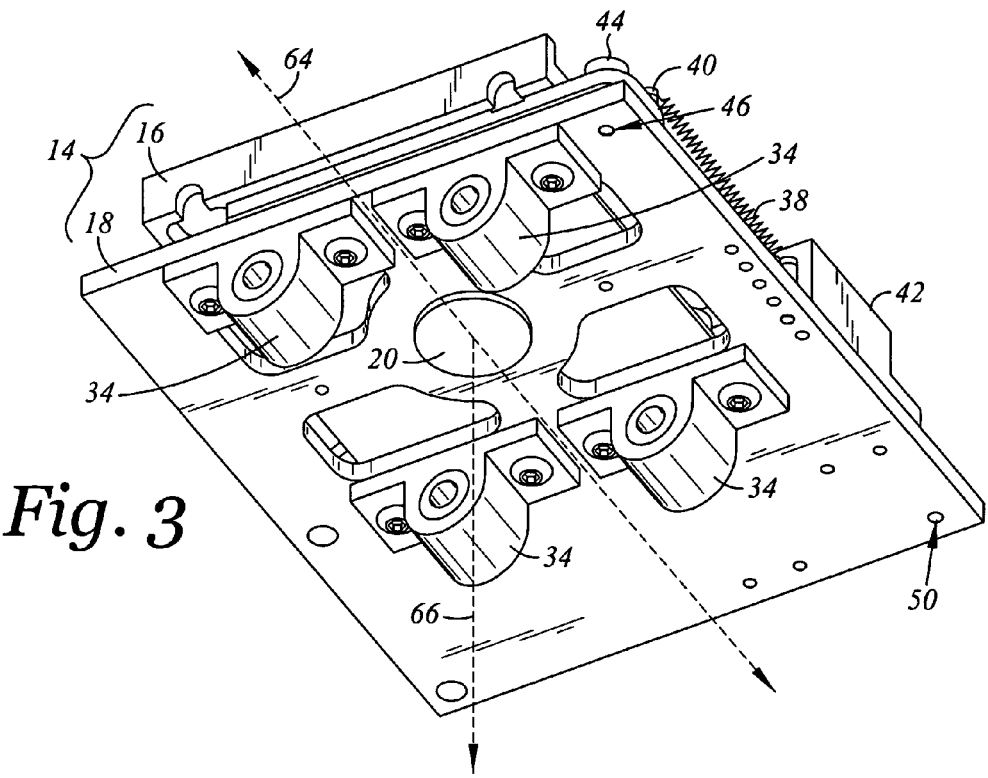
FIG. 3 is a bottom perspective view of the retaining element of FIG. 2.

According to the embodiment shown, as depicted in FIG. 2 there is an enlarged perspective view of the retaining element 14 of the testing apparatus 10 of FIG. 1 as seen from another angle. The retaining element 14 is shown in relation to a base support 52. The base support 52 is attached to the base platform 12. FIG. 3 is a bottom perspective view of the retaining element 14 of FIG. 2. FIG. 4 is the perspective view of the retaining element 14 and the base support element 52 of FIG. 2 as shown with the data storage component 26.

The retaining element 14 may include a first fixture 16 sized and configured to retain the data storage component 26. The retaining element 14 may further include a second fixture 18 coupled to the first fixture 16 and the base platform 12. A pivot pin 20 may be disposed between the first and second fixtures 16, 18 for relative rotational movement. The first fixture 16 is configured to rotate about an axis of rotation 66. In this regard, FIG. 5 is the perspective view of the retaining element 14 and the base support element 52 of FIG. 2 as shown with the first fixture 16 of the retaining element 14 rotated relative to a second fixture 18 of the retaining element 14.

A return spring 38 may be provided which is disposed between the first and second fixtures 16, 18. The return spring 38 is configured to maintain the first and second fixtures 16, 18 in angular alignment and resists relative rotational movement. The first fixture 16 may be configured to receive a spring retaining pin 40 and the second fixture 18 may be configured to receive a spring retaining pin 42. The return spring 38 may be attached to the spring retaining pins 40, 42.

The retaining element 14 may include rods 32. The second fixture 18 may include rod supports 34 which are configured to receive the rods 32 in sliding engagement. The rods 32 are contemplated to be fixed relative to the base platform 12. As can be seen, the rods 32 are disposed in parallel so as to allow and constrain the second fixture 18 to move in substantially linear directions along a single axis of linear motion 64. In this regard, the term "substantially" refers to the fact that it is contemplated that there may be some degree of negligible movement in other directions such as due to misalignment of the rods 32 and the rod supports 34, manufacturing tolerances, and general "play" between the interfacing elements.

The retaining element 14 may further include bushings 36 which are disposed about the rods 32. Such bushings 36 function to provide a high stiffness spring between the second fixture 18 and the base platform 12 along the axis of linear motion 64. In addition, the bushings 36 may serve a dampening function for linear movement of the second fixture 18 along the axis of linear motion 64.

As shown in FIG. 2, the second fixture 18 may be fixed or locked relative to the first fixture 16. A first locking pin 44 may be provided for fixedly coupling the second fixture 18 relative to the first fixture 16. As seen in FIG. 5, the first fixture 16 may include a first locking pin hole 54 for receiving the first locking pin 44. As seen in FIG. 3, the second fixture 18 may also include a first locking pin hole 46 for receiving the first locking pin 44. In addition, the second fixture 18 may be fixed or locked relative to the base platform 12. A second locking pin 48 may be provided for fixedly coupling the second fixture 18 relative to the base platform 12. In this regard, the second locking pin 48 is configured to engage the base support 52, which is attached to the base platform 12. The second fixture 18 may include a second locking pin hole 50 as seen in FIG. 3. It is understood that the retaining element 14 would not be employed with both of the first and second locking pins 44, 48 engaged as shown in FIGS. 2 and 3 (as the entire retaining element 14 would be constrained). In this regard, FIGS. 2 and 3 are used for purposes of showing all of the elements of the retaining element 14 of this embodiment.

The first and second fixtures 16, 18 are linearly movable relative to the base platform 12 during the linear acceleration mode without substantial rotational movement with the second fixture 18 in a first configuration such as shown in FIG. 4. In this regard, the first locking pin 44 may be engaged with the first and second fixtures 16, 18 and the second locking pin 48 would be removed from the second fixture 18 and the base support 52. The actuator, such as the vibration actuator 22 or the shock actuator 24, is disposable in mechanical communication with the first fixture 16 with the second fixture 18 in the first configuration for linearly moving the first fixture 16 relative to the base platform 12.

As shown in FIG. 5, the first and second fixtures 16, 18 are rotationally movable relative to each other in a second configuration of the second fixture 18. In the second configuration of the second fixture 18, the second fixture 18 is rotatably coupled to the first fixture 16. In this regard, the first locking pin 44 is removed from the first fixture 16. The first fixture 16 is rotationally movable relative to the second fixture 18 and the base platform 12 without substantial linear movement during a rotational acceleration mode with the second fixture 18 in the second configuration. The actuator, such as the vibration actuator 22 or the shock actuator 24, is further disposable in mechanical communication with the first fixture 16 with the second fixture 18 in the second configuration for rotatably moving the first fixture 16 relative to the second fixture 18 and the base platform 12.

As mentioned above, the actuator may take the form of the vibration actuator 22 or the shock actuator 24. It is contemplated that the present invention may be implemented with either of such the vibration actuator 22 or the shock actuator 24 or both. Referring now to FIG. 6, there is depicted an enlarged view of the vibration actuator 22 of FIG. 1 as seen from another angle. The vibration actuator 22 may include a vibration actuation pin 56 that is configured to reciprocate along a vibration axis of motion 58. The vibration actuator 22 may take the form of a relatively low cost dc motor that includes a cam that engages the vibration actuation pin 56, for example. Other devices such as pneumatic or hydraulic based motors, low frequency solenoid devices, or those that are chosen from those which are well known to one of ordinary skill in the art may be utilized. The vibration actuator 22 may be disposed in electrical communication with a vibration actuator controller 28.

Referring now to FIG. 7, there is depicted an enlarged view of the shock actuator 24 of FIG. 1. The shock actuator 25 may include a shock actuation pin 60 that is configured to move along a shock axis of motion 62. The shock actuator 24 may take the form of a relatively low cost solenoid device for example. Other devices such as a voice coil motor, a dc linear motor, a pneumatic device, a hydraulic device or which are chosen from those which are well known to one of ordinary skill in the art may be utilized. The shock actuator 24 may be disposed in electrical communication with a shock actuator controller 30.

As mentioned above, the retaining element 14 is linearly movable relative to the base platform 12 during a linear acceleration mode without substantial rotational movement. In this regard, the term "substantial" refers to the fact that it is contemplated that there may be some degree of negligible rotational movement such as due to manufacturing tolerances and general "play" between the interfacing elements. Further, as mentioned above the retaining element 14 is rotationally movable relative to the base platform 12 without substantial linear movement during a rotational acceleration mode. In this regard, the term "substantial" refers to the fact that it is contemplated that there may be some degree of negligible linear movement such as due to manufacturing tolerances and general "play" between the interfacing elements.

As mentioned above, the testing apparatus 10 is generally for use with a data storage component 26. In this regard, the data storage component 26 may be of any number of devices such as a disk drive. As shown in FIG. 4, the data storage component 26 takes the form of a disk drive base. As such, the first fixture 16 is configured to retain the disk drive base. It is contemplated that during testing, other components of the disk drive would also be included with the disk drive base. However, such other components (such as a head stack assembly, a spindle motor and disks) are not shown for ease of illustration of the first fixture 16 shown retaining the data storage component 26.

Figure 8:
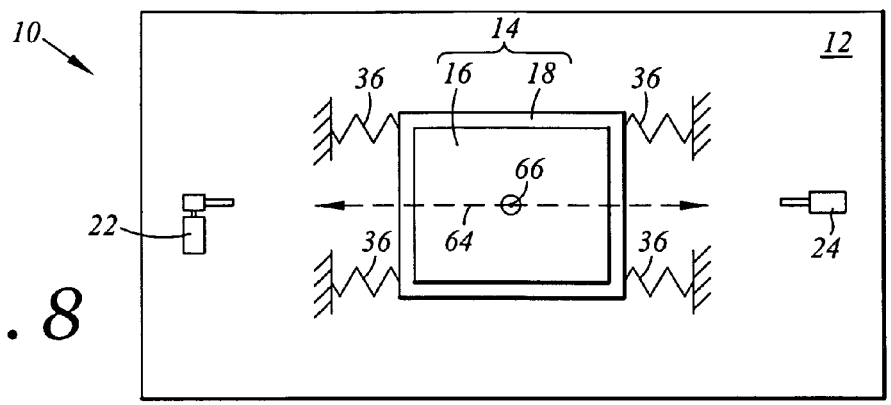
FIG. 8 is a symbolic diagram of the testing apparatus of FIG. 1.
Figure 9:
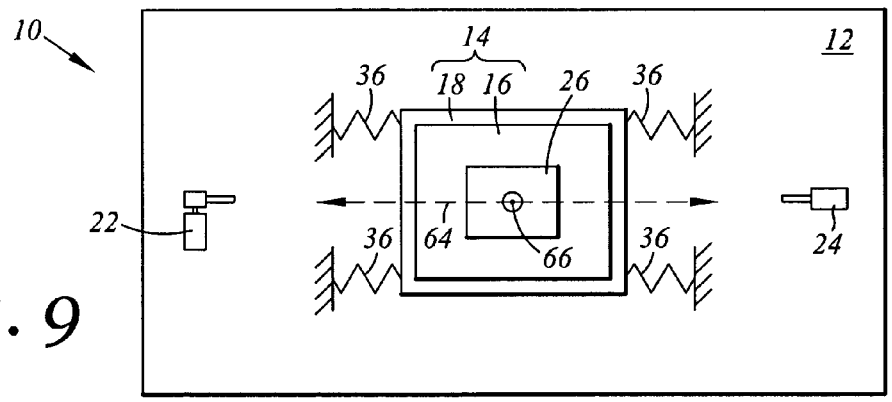
FIG. 9 is the symbolic diagram of the testing apparatus of FIG. 8 as shown with a data storage component.

Referring now to FIG. 8 there is depicted a symbolic diagram of the testing apparatus 10 of FIG. 1. FIG. 9 is the symbolic diagram of the testing apparatus 10 of FIG. 8 as shown with the data storage component 26.

Figure 10:
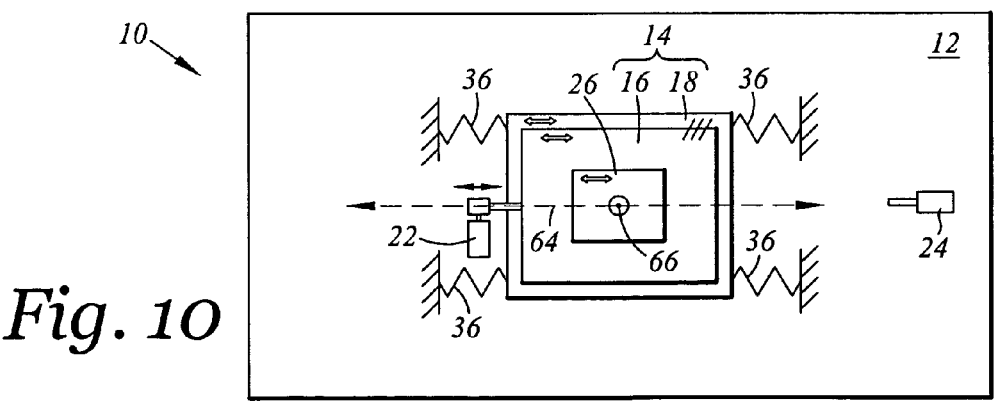
FIG. 10 is the symbolic diagram of the testing apparatus of FIG. 9 as shown with the vibration actuator disposed against the first fixture with the second fixture in a first configuration for moving the first fixture in a linear acceleration mode.

FIG. 10 is the symbolic diagram of the testing apparatus 10 of FIG. 9 as shown with the vibration actuator 22 disposed against the first fixture 16 with the second fixture 18 in the first configuration for moving the first fixture 16 in a linear acceleration mode. In this regard, the first and second fixtures 16, 18 are indicated as being locked or fixedly coupled with respect to each other. As such, movement of the first fixture 16 as inducted by the vibration actuator 22 results in a linear acceleration mode of not only the first fixture 16 but also the second fixture 18 and the retained disk drive component 26 along an axis of linear motion 64 with respect to the base platform 12.

Figure 11:
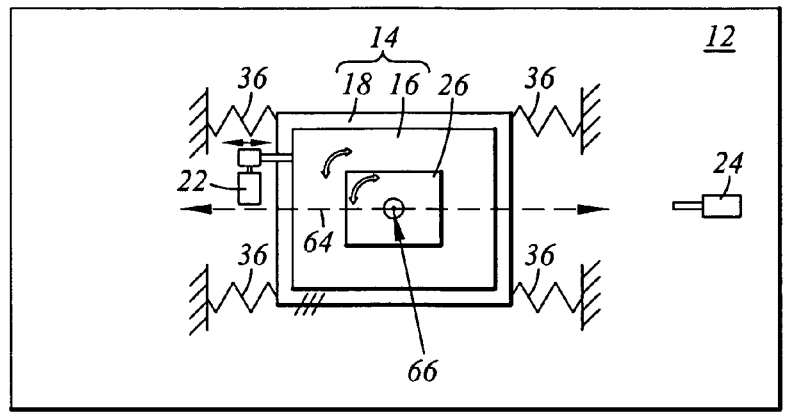
FIG. 11 is the symbolic diagram of the testing apparatus of FIG. 9 as shown with the vibration actuator disposed against the first fixture with the second fixture in a second configuration for moving the first fixture in a rotational acceleration mode.

FIG. 11 is the symbolic diagram of the testing apparatus of FIG. 9 as shown with the vibration actuator 22 disposed against the first fixture 16 with the second fixture 18 in the second configuration for moving the first fixture 16 in a rotational acceleration mode. In this regard, the second fixture 18 and the base platform 12 are indicated as being locked or fixedly coupled with respect to each other. In addition, the vibration actuator 22 is shown as being positioned away from the axis of linear motion 64. As such, actuation of the first fixture 16 by the vibration actuator 22 results in movement of the first fixture 16 and the retained data storage component 26 about an axis of rotation 66.

Figure 12:
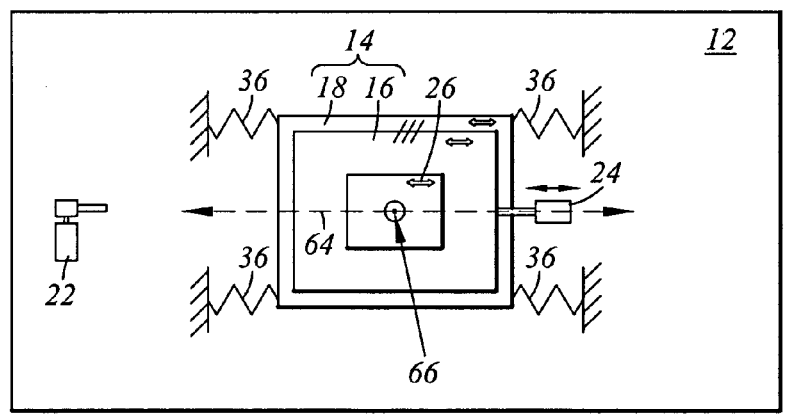
FIG. 12 is the symbolic diagram of the testing apparatus of FIG. 9 as shown with the shock actuator disposed against the first fixture with the second fixture in a first configuration for moving the first fixture in a linear acceleration mode.

FIG. 12 is the symbolic diagram of the testing apparatus 10 of FIG. 9 as shown with the shock actuator 24 disposed against the first fixture 16 with the second fixture 18 in the first configuration for moving the first fixture 16 in a linear acceleration mode.

Figure 13:
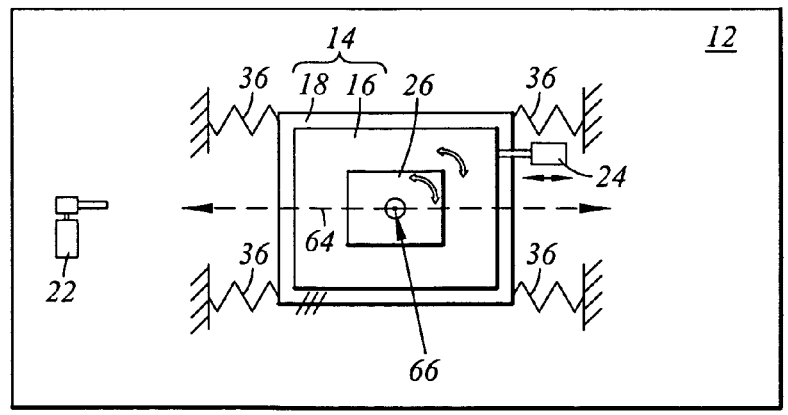
FIG. 13 is the symbolic diagram of the testing apparatus of FIG. 9 as shown with the shock actuator disposed against the first fixture with the second fixture in a second configuration for moving the first fixture in a rotational acceleration mode.

FIG. 13 is the symbolic diagram of the testing apparatus 10 of FIG. 9 as shown with the shock actuator 24 disposed against the first fixture 16 with the second fixture 18 in the second configuration for moving the first fixture 16 in a rotational acceleration mode.

According to another aspect of the present invention, there is provided the testing apparatus 10 for use with the data storage component 26. The testing apparatus 10 includes the base platform 12, the first fixture 16 sized and configured to retain the data storage component 26, and the second fixture 18 coupled to the first fixture 16 and the base platform 12. The second fixture 18 includes a first configuration with the second fixture 18 being fixed relative to the first fixture 16 and linearly movable relative to the base platform 12 without substantial rotational movement. The second fixture 18 includes a second configuration with the second fixture 18 being rotatably coupled to the first fixture 16. In the second configuration, the first fixture 16 is rotationally movable relative to both the second fixture 18 and the base platform 12 without substantial linear movement.

It is understood that as shown in the figures, the retaining element 14 is coupled with the base platform to have constrained linear movement in the first configuration. Further, the retaining element 14 is configured such that the first and second fixtures 16, 18 are rotatably moveable with respect to each other in a second configuration. It is contemplated that other configurations of the retaining element 14 and the base platform 12 may be utilized according to other embodiments. For example, the retaining element 14 may be configured to be constrained to rotationally move with respect to the base platform 12 and the first and second fixtures 16, 18 could be constrained to linearly move with respect to each other.

We claim:

1. A combined linear and rotational acceleration testing apparatus for use with a data storage component, the testing apparatus comprising:
   a base platform;
   a retaining element coupled to the base platform, the retaining element being sized and configured to retain the data storage component, the retaining element being linearly movable relative to the base platform during a linear acceleration mode without substantial rotational movement, the retaining element being rotationally movable relative to the base platform without substantial linear movement during a rotational acceleration mode; and
   an actuator disposable in mechanical communication with the retaining element for moving the retaining element relative to the base platform.

2. The testing apparatus of claim 1 wherein the actuator is a vibration actuator.

3. The testing apparatus of claim 2 wherein the vibration actuator is a dc motor.

4. The testing apparatus of claim 1 wherein the actuator is a shock actuator.

5. The testing apparatus of claim 4 wherein the shock actuator is a solenoid device.

6. The testing apparatus of claim 1 wherein the actuator includes a vibration actuator and a shock actuator.

7. The testing apparatus of claim 1 wherein the data storage component is a disk drive base and the retaining element is sized and configured to retain the disk drive base.

8. The testing apparatus of claim 1 wherein the retaining element includes:
   a first fixture sized and configured to retain the data storage component; and
   a second fixture coupled to the first fixture and the base platform, the second fixture including a first configuration with the second fixture being fixed relative to the first fixture, the second fixture including a second configuration with the second fixture being rotatably coupled to the first fixture.

9. The testing apparatus of claim 8 wherein the first and second fixtures are linearly movable relative to the base platform during the linear acceleration mode without substantial rotational movement with the second fixture in the first configuration.

10. The testing apparatus of claim 8 wherein the first fixture is rotationally movable relative to the second fixture and the base platform without substantial linear movement during a rotational acceleration mode with the second fixture in the second configuration.

11. The testing apparatus of claim 8 wherein the actuator is disposable in mechanical communication with the first fixture with the second fixture in the first configuration for linearly moving the first fixture relative to the base platform, the actuator is further disposable in mechanical communication with the first fixture with the second fixture in the second configuration for rotatably moving the first fixture relative to the second fixture and the base platform.

12. The testing apparatus of claim 8 further includes a pivot pin disposed between the first and second fixtures for relative rotational movement.

13. The testing apparatus of claim 8 further includes a locking pin for fixedly coupling the second fixture relative to the first fixture in the first configuration of the second fixture.

14. A testing apparatus for use with a data storage component, the testing apparatus comprising:
   a base platform;
   a first fixture sized and configured to retain the data storage component; and
   a second fixture coupled to the first fixture and the base platform, the second fixture including a first configuration with the second fixture being fixed relative to the first fixture and linearly movable relative to the base platform without substantial rotational movement, the second fixture including a second configuration with the second fixture being rotatably coupled to the first fixture;
   wherein in the second configuration the first fixture being rotationally movable relative to both the second fixture and the base platform without substantial linear movement.

15. The testing apparatus of claim 14 further includes a pivot pin disposed between the first and second fixtures for relative rotational movement.

16. The testing apparatus of claim 14 further includes a locking pin for fixedly coupling the second fixture relative to the first fixture in the first configuration of the second fixture.

17. The testing apparatus of claim 14 wherein the data storage component is a disk drive base and the first fixture is sized and configured to retain the disk drive base.

18. A testing apparatus for use with a data storage component, the testing apparatus comprising:
   a base platform;
   a retaining element coupled to the base platform, the retaining element including:
      a first fixture sized and configured to retain the data storage component; and
      a second fixture coupled to the first fixture and the base platform, the second fixture including a first configuration with the second fixture being fixed relative to the first fixture and linearly movable relative to the base platform without substantial rotational movement, the second fixture including a second configuration with the second fixture being rotatably coupled to the first fixture;
      wherein in the second configuration the first fixture being rotationally movable relative to both the second fixture and the base platform without substantial linear movement;
   a vibration actuator disposable in mechanical communication with the first fixture for moving the first fixture relative to the base platform; and
   a shock actuator disposable in mechanical communication with the first fixture for moving the first fixture relative to the base platform.

19. The testing apparatus of claim 18 further includes a locking pin for fixedly coupling the second fixture relative to the first fixture in the first configuration of the second fixture.

* * * * *